United States Patent [19]

Peppler et al.

[11] 3,862,621

[45] Jan. 28, 1975

[54] POULTRY WATERING CUP

[75] Inventors: William S. Peppler, New York, N.Y.; Everett M. Keen, Anthony J. Siciliano, Graham Baker, Vineland, N.J.

[73] Assignee: Diamond International Corporation, New York, N.Y.

[22] Filed: Mar. 1, 1973

[21] Appl. No.: 337,201

[52] U.S. Cl. .................................................. 119/75
[51] Int. Cl. ............................................. A01k 7/00
[58] Field of Search ........................... 119/72.5, 75

[56] References Cited
UNITED STATES PATENTS

| | | | |
|---|---|---|---|
| 1,249,139 | 12/1917 | Lewis | 119/75 |
| 2,319,928 | 5/1943 | Hart | 119/75 |
| 2,710,594 | 6/1955 | Thompson | 119/72.5 |
| 3,357,406 | 12/1967 | Robinson | 119/75 X |
| 3,483,847 | 12/1969 | Kneubuehl | 119/75 |
| 3,602,197 | 8/1971 | Fioretto | 119/72.5 |

*Primary Examiner*—Louis G. Mancene
*Assistant Examiner*—J. N. Eskovitz
*Attorney, Agent, or Firm*—Karl W. Flocks

[57] ABSTRACT

A watering cup for poultry comprising endless passage means adapted to be connected to a water supply source, valve assembly disposed within said passage means including a valve seat, a valve member seated upon said valve seat and valve triggering means extending from said valve means into said cup whereby said valve member may be unseated to thereby allow water to flow from said water supply source into said cup. The interior of said cup additionally comprising overflow prevention drain means whereby excessive water may be drained off so that the water level within the cup does not exceed a predetermined level. The interior of said cup further comprising downwardly converging walls whereby floating weight means may be automatically directed against said triggering means by gravity to assist relatively young poultry, normally incapable of reaching said triggering means, and obtaining water.

12 Claims, 4 Drawing Figures

PATENTED JAN 28 1975

3,862,621

POULTRY WATERING CUP

BACKGROUND OF THE INVENTION

1. Field of the Invention

The field of the invention is believed to be confined in Class 119, Subclass 72 and subclasses indented thereunder.

2. Description of the Prior Art

Poultry watering cups of the type which poultry themselves actuate valve means to fill the watering cups have been in use for many years. However, the known watering cups of this type are not satisfactory for the reason that they frequently become overfilled and spill into the poultry cage area thus creating uncomfortable and unsanitary conditions for the poultry.

Representative of some of the more recent types of watering cups to meet the needs of large-scale commercial poultrymen are U.S. Pat. No. 3,353,518 (Hart) and U.S. Pat. No. 3,483,847 (Kneubuehl). In both the Hart and the Kneubuehl patents watering cups are provided with valve means including actuating or triggering means by which the poultry may actuate and thereby avail themselves to the water supplied to the cup from the watering source.

SUMMARY OF THE INVENTION

The present invention provides a new and improved watering cup which includes a drain that can either overflow into a trough or a pipe system which will run completely out of the poultry house into a field drain system. In this manner the inside of the poultry house, especially the manure, is maintained as dry as possible to provide optimum environmental conditions. Disease among the poultry is thus reduced to a minimum.

The present invention also provides a water cup that is self-cleaning by the birds as they drink the water.

The present invention additionally provides a cup of the right dimensions so that it does not accumulate dirt; and of a small enough size so that in the event that a bird or chick stands on the edge thereof, the droppings will miss the cup.

The present invention further provides a low-cost dependable watering device.

The present invention further provides a water cup of low level and of such shape that the cup remains reasonably clean. Feed residue that accumulates in the cup from the birds' beaks is removed when the birds drink the water.

A further advantage of the present invention lies in the fact that growing or mature chickens cannot drink all of the water out of the cup without triggering off incoming water.

Still another advantage of the present invention is that a plastic ball, which is optional for baby chicks, with a specific gravity of approximately one, and with a low water pressure may be provided to assist the baby chicks in triggering the valve to allow water to flow into the cup.

A further important advantage of the present invention lies in the valve stem which limits the rate of flow of water into the cup. In this connection the relationship between the valve member and the bore of the passageway controls the water flow which in turn controls valve stem oscillations. Restriction of movement of the stem in accordance with the present invention causes the valve to close quickly and thus limits the amount of water entering the cup. In this manner the chickens may drink from the cup without being disturbed by an oscillating or vibrating valve stem and thereby obtain their necessary requirement of water.

Basically the present invention relates to a watering cup suitable for use in raising poultry from baby chicks to fully mature birds. The cup is for use in conjunction with a low pressure water supply force, and includes a valve of restricted movement. Restricted movement of the valve minimizes oscillation or vibration thereof. The valve further comprises an elongated portion extending into the cup for actuation by the bird whereby the valve may be unseated to permit water to flow from the source into the cup. The present invention further includes the feature of a drain which insures that the water level within the cup does not rise above a predetermined height and thereby prevent overflow of water from the cup and into the poultry cage or house.

BRIEF DESCRIPTION OF THE DRAWINGS

An example of the invention is shown in the accompanying drawings in which.

DETAILED DESCRIPTION OF SPECIFIC EMBODIMENT

Figure 1:
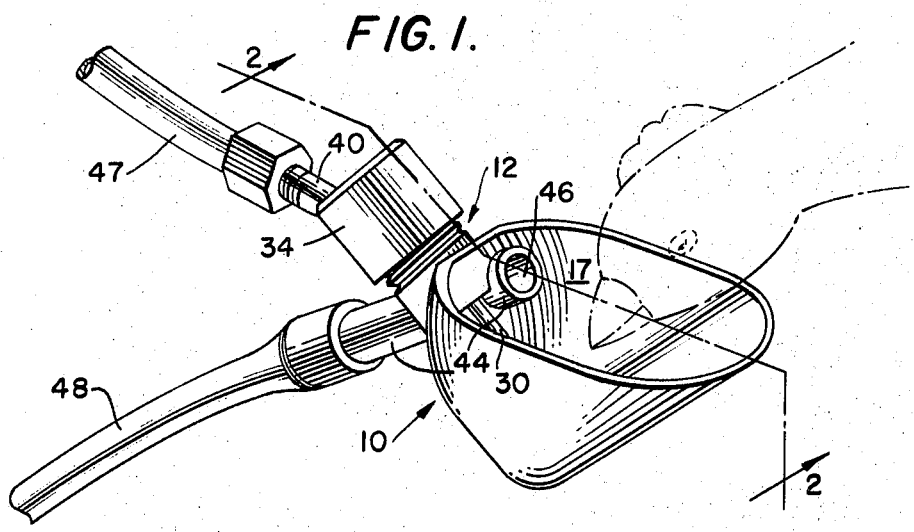
FIG. 1 is a view in perspective of the drinking cup according to the present invention.
Figure 2:
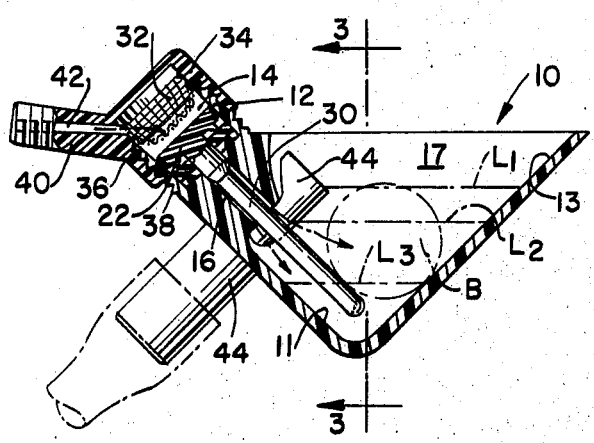
FIG. 2 is a sectional view of the drinking cup taken along the plane of 2—2 in FIG. 1.
Figure 4:
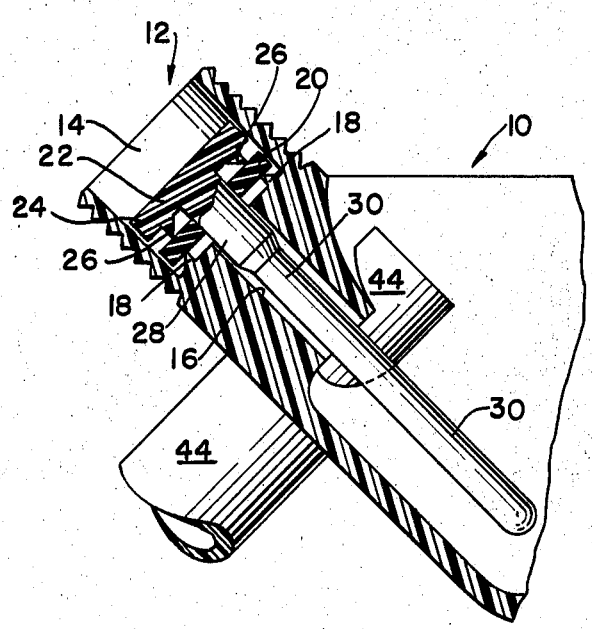
FIG. 4 is a fragmentary view of a portion of FIG. 3 as enlarged to more clearly illustrate details of the valve assembly.

Referring now particularly to FIGS. 1 and 2, it is seen that the drinking cup 10 according to the present invention comprises an inlet conduit 12 provided with a generally cylindrical cavity 14 extending downwardly and forwardly at an angle. Extending from the lower end of the cavity 14 is a through passage 16 of reduced dimension. The through passage 16 terminates in the interior of the drinking cup 10. Within the cavity 14 and just above the passage 16 is an annular lip 18, which is triangular in cross-section, and extends around the opening of passage 16 to form a valve seat. As best seen in FIG. 4 a washer 20 of rubber or other suitable material is seated upon the annular lip 18 and in combination with a valve 22 controls flow of water from the supply source into the drinking cup 10. The valve 22 is generally T-shaped in cross-section and comprises a head 24 which is disc-shaped, an annular lip 26 on the underside of the head 24 and a stem 28 extending from the underside of the valve head 24 through the washer 20 into passage 16. In assembly the annular lip 26 is normally seated upon the washer 20 and the valve stem 28 is in relatively close-fitting relationship within the bore of passage 16. Extending from the end of stem 28 and within passage 16 is an elongated valve actuator or trigger element 30, which extends down into the interior of the watering cup 10.

Disposed above the valve head 24 and within the cavity 14 of conduit 12 is a strainer 32 which prevents dirt or debris from backing into the supply line. A removable coupling member 34 in the form of a cap is disposed around inlet conduit 12 to connect a supply source thereto. The coupling member 34 may include suitable internal threads 36 to cooperatively engage with external threads 38 provided on the outer periphery of inlet conduit 12. As shown in FIG. 2 a connector pipe portion 40 extends from the rear of coupling member 34 and includes a passageway 42 which communicates with inlet conduit 12. Connector pipe portion 40 may be connected in any suitable manner, for example, by a threaded connection to water supply line 47.

Extending downwardly and outwardly from within the watering cup 10 is a drainpipe 44 which is provided with a through opening 46 to maintain the level of the water within the cup at a predetermined level and thus prevent overflowing of the cup.

Figure 3:
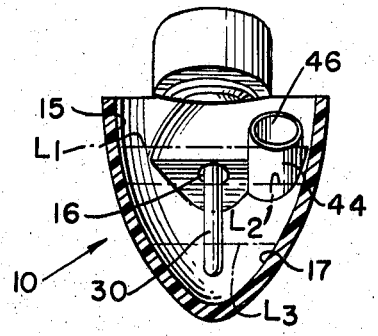
FIG. 3 is a sectional view of the drinking cup taken along the plane of 3—3 in FIG. 2.

As seen in FIGS. 2 and 3 water exceeding the level $L_1$ may thus drain out through opening 46 of the pipe 44 and into a carry-off tube 48.

When the watering cup 10 is used to service baby chicks or young birds which are not sufficiently aggressive to peck at the valve actuator or trigger 30, means, such as a plastic ball B of unit specific gravity, may be inserted in the watering cup 10 to assist the baby chicks or young birds to actuate or trigger the valve 22 and thereby obtain adequate drinking water. With the water level of $L_2$ the ball B will be floating so that the young chick may be able to peck at it and thus cause it to contact actuator 30. However, if the water level should drop to level $L_3$, the ball B because of gravity and the conical shape of cup 10 with the interior walls 11, 13, 15 and 17, all of which converge in a downwardly direction along with gravity automatically directs the ball B against actuator 30. As long as the ball B is resting against actuator 30 the valve 22 will be tilted into an unseated position and allow water to flow from passage 42 into the cavity 14, through strainer 32, passage 16 and into the drinking cup 10. Thus water will flow into cup 10 until it reaches a level which will raise ball B away from the actuator 30. To best attract the attention of the birds the actuator 30 and/or the ball B should be of a color that is in contrast to the cup 10. For example, the cup 10 may be red and the actuator 30 and/or ball B may be white so that the birds would be attracted to the actuator 30 and/or ball B and peck at it to get to the last drop of water.

According to the preferred embodiment of the present invention the drinking cup 10 is made of plastic material and is molded in one piece including the inlet conduit 12 and the overflow prevention drainpipe 44. It is contemplated, however, that the watering cup according to the present invention may be made of other suitable material and/or from separately preformed, assembled pieces.

MODE OF OPERATION

In carrying forth the operation of the present invention the various parts thereof are assembled to provide a relationship as described above. When used in connection with the feeding and caring of baby chicks or other young birds that are not sufficiently aggressive to peck at the valve actuator 30, a ball B of unit of specific gravity may be inserted into the water cup 10 as described above. Otherwise older poultry may obtain water from the watering cup 10 by pecking against the actuator 30. It is noted that the valve stem 28 together with the actuator 30 extends within the passage 16 and is free to move in a 360° arc and thus may be triggered or actuated by movement thereof from any direction therearound. The rubber washer 20 is a flat, round washer of low durometer and seated against the plastic rib 18 under low water pressure of approximately one to three pounds pressure per square inch. Thus a water pressure of two pounds per square inch may be incorporated into this system to accommodate chickens ranging in age from day old chicks to fully mature birds.

When a bird desires water from the drinking cup 10 and it is necessary to raise the water level, it is only necessary that the actuator 30 be tilted directly by the bird pecking at it or indirectly through the ball B being moved or pushed against the actuator 30 which thereby dislodges valve 22 from its seat and allows the water to flow from supply line 47 through passage 42 into cavity 14 through strainer 32 and thereafter through passage 16 into the cup 10. Use of the ball B may not be necessary even in the case of very young birds and, hence, is optional and is in all probability to be determined by the aggressiveness of the birds.

Because of the relatively close fitting tolerance between valve stem 28 and passageway 16, oscillation or vibration thereof is greatly reduced and thus the birds may drink from the cup 10 without disturbance therefrom.

Although the invention has been described with a certain degree of particularity, it is understood that the present disclosure has been made only by way of example and the numerous changes in details of construction and the combination and arrangement of parts may be resorted to without departing from the spirit and scope of the invention as hereinafter claimed.

What is claimed is:

1. A watering cup suitable for use in connection with poultry varying in size and/or age from baby chicks to fully mature birds, the said cup being suitable for use in conjunction with a low pressure water supply system and comprising an inlet conduit for connection with a supply, a valve assembly including a valve normally seated on a valve seat under relatively low water pressure to prevent flow of water into the cup, a valve stem extending into and through a passage in said valve assembly leading into said cup whereby actuation of said stem by poultry is readily achieved in drinking from said cup, overflow prevention drain means in the form of a hollow drainpipe extending from within said cup and through said cup whereby the height of the water may not exceed a predetermined level, namely that of said drain, and an auxiliary actuating means in the form of a floatable member of unity specific gravity provided in said cup whereby small birds that are not sufficiently aggressive to peck at the elongated portion of the valve stem in the cup may nevertheless actuate said valve stem by causing said floatable member to be moved against said elongated portion of the valve stem, said floatable member being separate from said stem and readily removable from said cup and said cup being generally conical in shape with the wall portions thereof converging in the downward direction so that as the water level drops in said cup said floatable member will be directed closer to said stem and facilitate actuation thereof by small birds.

2. The watering cup of claim 1 wherein said cup is of molded plastic.

3. The watering cup of claim 1 wherein said cup is a one-piece molding with said inlet conduit, said valve seat, and said drain means all being one integral piece.

4. The watering cup of claim 1 wherein said valve stem extends from the underside of said valve and said valve stem further includes a portion of relatively close fitting dimensions with respect to said passage within which it extends whereby oscillation and/or vibration of said valve stem is held to a minimum because of its restricted movement.

5. The watering cup of claim 4 wherein said valve stem further includes an elongated portion of reduced diametrical dimensions extending into said watering cup for actuation to maintain a desired drinking level.

6. The watering cup of claim 5 wherein said valve assembly comprises an annular lip of triangular cross section extending above and around the passage leading into said cup.

7. The watering cup of claim 6 wherein said valve assembly includes a flat washer normally seated upon said annular lip and including a central opening extending around said valve stem.

8. The watering cup of claim 7 wherein said valve is generally T-shaped in cross-section with the head of the T being a flat disc with an annular lip portion of triangular cross-section extending from the underside thereof and normally seated upon said washer.

9. The watering cup of claim 8 wherein said valve assembly includes a strainer disposed upstream thereof to prevent passage of dirt or debris therethrough in either direction.

10. The watering cup of claim 1 wherein said auxiliary actuating means is of such size with respect to said cup that in the absence of adequate water to keep it afloat gravity along with the conical shape of said cup will automatically funnel it against the elongated portion of the valve stem and thereby actuate said stem to cause water to flow into said cup until the said auxiliary actuating means is afloat.

11. The watering cup of claim 10 wherein said auxiliary actuating means is a ball and will not become wedged into malfunction in any way.

12. The watering cup of claim 10 wherein said actuating means is of a contrasting color to the cup such as for example a red cup and a white stem or ball that would attract the attention of birds to it, which would then peck at it or move it to get the last drops of water.

* * * * *